United States Patent [19]

Harthun

[11] 4,159,025
[45] Jun. 26, 1979

[54] BACK FLOW PREVENTER VALVE

[75] Inventor: Norman E. Harthun, San Carlos, Calif.

[73] Assignee: Telford L. Smith, Watsonville, Calif.

[21] Appl. No.: 794,479

[22] Filed: May 6, 1977

[51] Int. Cl.$^2$ ............................................. F16K 15/06
[52] U.S. Cl. ................................... 137/512; 137/116; 137/116.3; 137/117; 137/218; 137/515.7; 137/541
[58] Field of Search ............ 137/216, 218, 512, 515.7, 137/541, 542

[56] References Cited

U.S. PATENT DOCUMENTS

| | | | |
|---|---|---|---|
| 1,779,421 | 10/1930 | Cox | 137/541 X |
| 2,608,210 | 8/1952 | St. Clair | 137/541 |
| 2,612,408 | 9/1952 | Kurata | 137/542 X |
| 2,628,810 | 2/1953 | Moore | 137/542 X |
| 3,590,851 | 7/1971 | Bogossian | 137/541 X |
| 4,013,088 | 3/1977 | Gocke | 137/218 X |

FOREIGN PATENT DOCUMENTS

| | | | |
|---|---|---|---|
| 814287 | 6/1959 | United Kingdom | 137/515.7 |
| 1254858 | 11/1971 | United Kingdom | 137/515.7 |

*Primary Examiner*—Robert G. Nilson
*Attorney, Agent, or Firm*—Owen, Wickersham & Erickson

[57] ABSTRACT

A back flow preventer valve assembly for protecting fluid supply systems against back flow of contaminating fluids includes a pair of serially connected check valves positioned within respective housings which are connected together and to inlet and outlet fittings by slidable sleeve-type couplings. The couplings are sealed to the fittings and to the valve housings by resilient annular gaskets, preferably O-rings. Tie bolts extend longitudinally from the inlet fitting coupling to the outlet fitting coupling to retain the assembly together. This assembly provides for interchangeability of components, easy removal of the valve units from the line in which they are connected without disconnection of the inlet and outlet fittings, and for easy replacement or substitution of a fitting. Each check valve includes a poppet assembly of advantageous modular construction, with components easily replaceable. In one form of the invention, a venting valve is connected between the two valve housings to relieve any pressurized fluid which might leak back through the downstream check valve when inlet fluid pressure is below the threshold pressure of the first check valve. The venting valve includes a cylindrical resilient diaphragm-type valve closure member which shuts off the venting valve whenever inlet line pressure is above the threshold pressure of the first check valve. The venting valve serves to provide, in addition to the tandem check valves, a third safety feature preventing infiltration of back flow into the inlet line.

5 Claims, 5 Drawing Figures

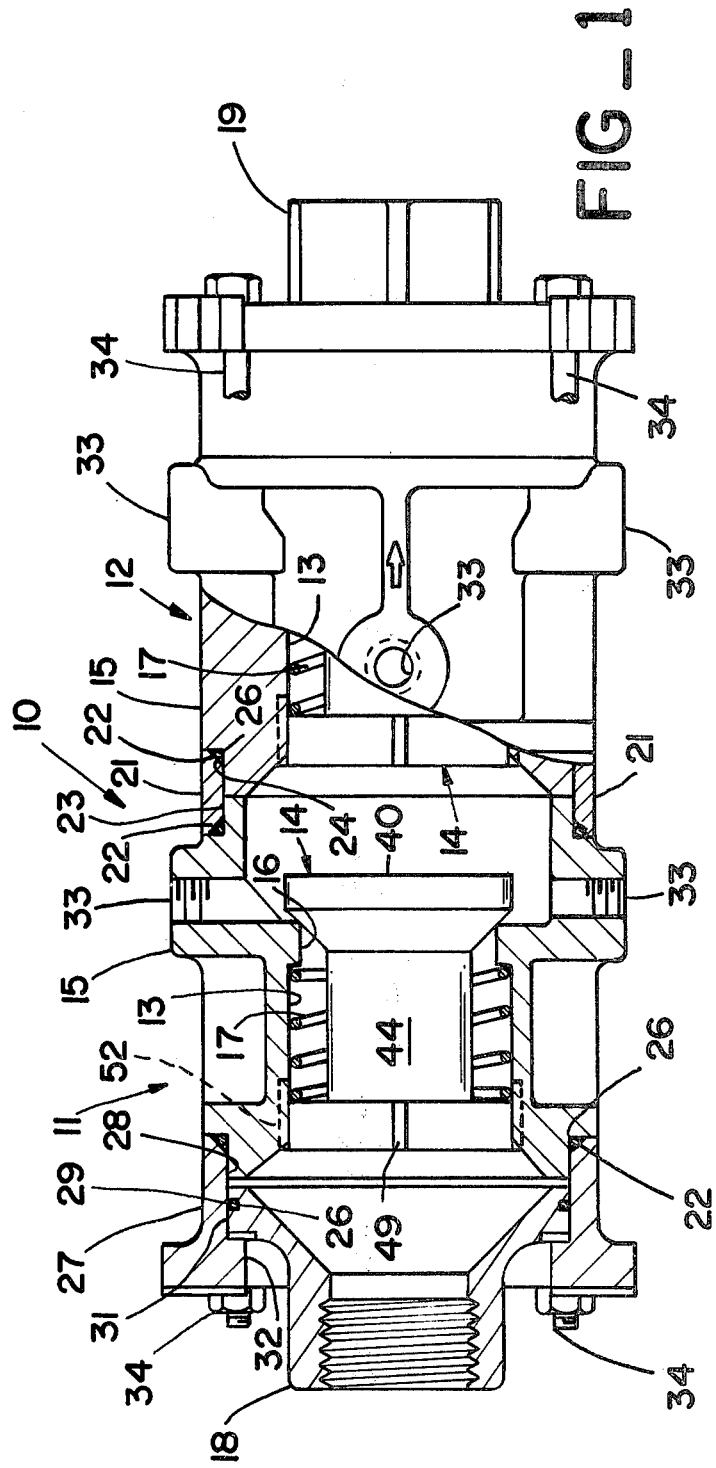
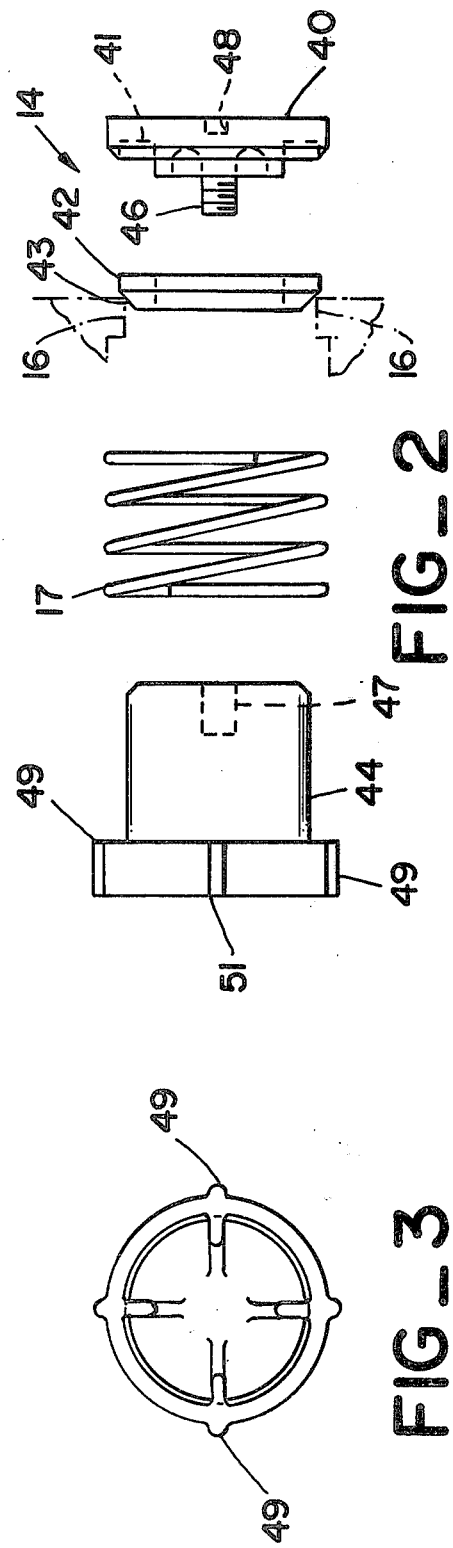

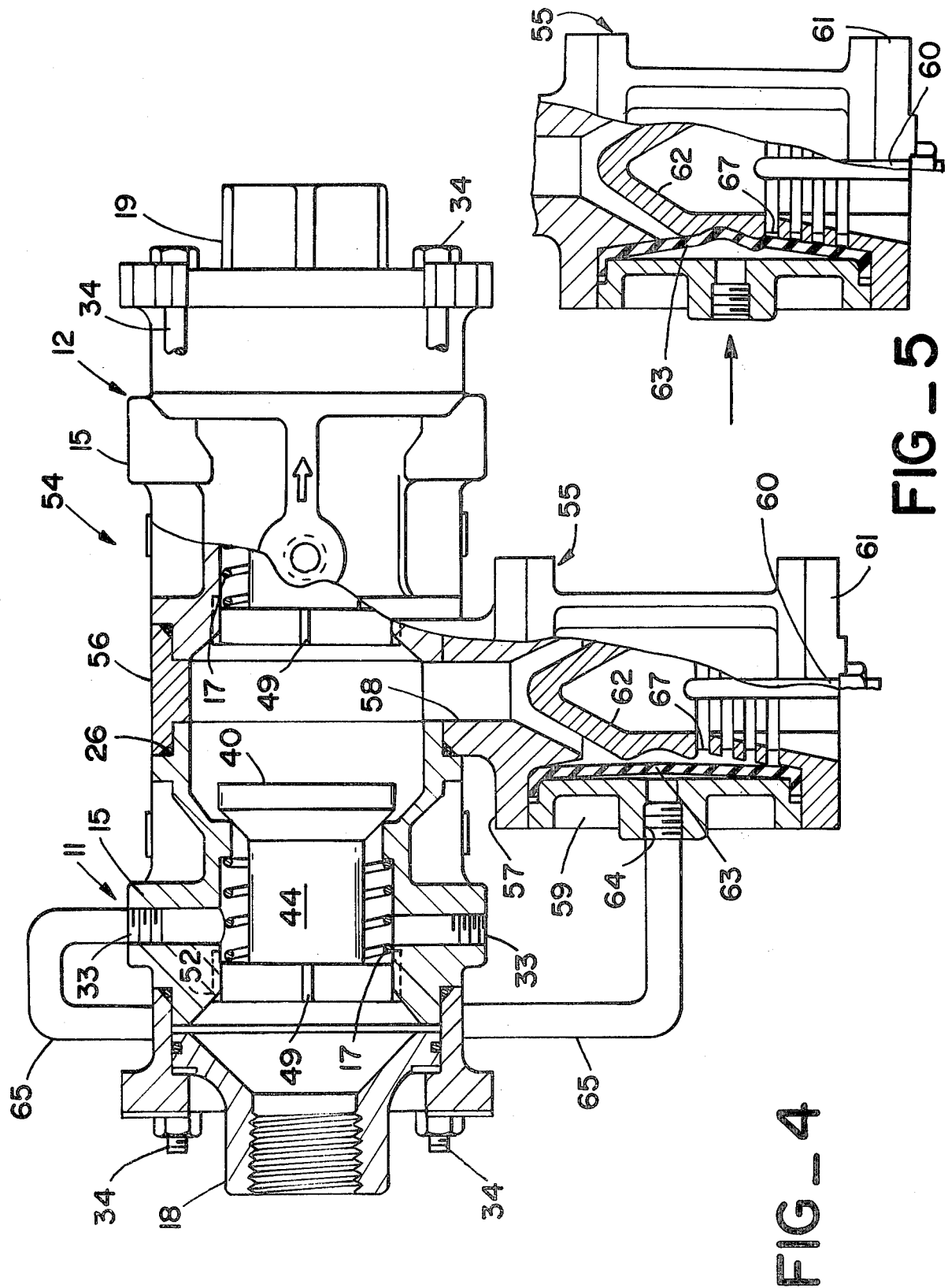

BACK FLOW PREVENTER VALVE

BACKGROUND OF THE INVENTION

The invention relates to apparatus for the purpose of preventing back flow of fluid, e.g. water, from a delivery line into a supply line, and more particularly to an improved valve of specifically advantageous modular-type construction, which may include a safety venting or "reduced pressure" feature.

Various types of apparatus have been used in connection with fluid supply systems for the purpose of preventing objectionable contamination due to back flow of contaminated fluid in a delivery piping to the supply piping. A simple check valve fulfills such a function, but there is always some danger of leakage sufficient to cause serious contamination, due, for example, to wear or failure of the valve or an obstruction which prevents proper closure. Therefore, more elaborate back flow preventer valve assemblies have been suggested, often including several check valves positioned in series fashion between the inlet and outlet ends of the assembly, thus providing a double safety feature. In addition, some of these assemblies have included a third safety feature comprising a venting apparatus connected between the two check valves to vent the space between these valves to atmosphere in the event of a leakage back through the downstream check valve. As an example of this type assembly, see U.S. Pat. No. 2,586,942.

Some types of assembly have utilized venting valves with fluid connections to both the space between the check valves and the fluid supply line, the valve being operable to vent the space between the check valves to atomsphere when the pressure in the space obtained a value substantially equal to the inlet pressure. With such apparatus it was assumed that no contamination of the fluid inlet line can occur because the pressure upon the outlet side of the first check valve can in no event exceed the inlet line pressure. However, this creates a danger of back flow leakage through the first check valve in the event of any malfunction with that valve, since pressure in the space between the two check valves is allowed to build up substantially to inlet pressure before any venting occurs.

The above cited U.S. Pat. No. 2,586,942 suggested one solution to this problem, utilizing a rather complex assembly including thin-walled diaphragm-like valve closure members designed to transmit pressure differentials in an upstream direction through the closed valves.

None of the previously suggested back flow preventer valve assemblies has provided a relatively simple, efficient and fail-safe back flow preventer valve as does the present invention described below.

SUMMARY OF THE INVENTION

The back flow preventer valve assembly of the invention includes two check valves positioned in series, the two being identical units connected together and to end fittings by sleeve-type couplings with resilient gasket rings (e.g. O-rings), and longitudinally extending tie bolts. By the O-ring and sleeve arrangement, the end fittings are afforded a degree of longitudinal adjustment as well as unlimited rotational adjustment. This also enables the use of any type end fitting, of any material—welded, soldered, threaded connection, etc., although the assembly is particularly adaptable for injection molded plastic components. If an end fitting must be replaced, this is easily accomplished after removing the tie bolts and sliding back the end sleeve coupling, or both end sleeve couplings. If the valve components themselves must be repaired or replaced, this may be done without removing the entire valve assembly from the line. Once the tie bolts are removed and the end couplings are slid back, the remainder of the valve can be removed.

The check valves themselves are also of particularly advantageous construction. The valve poppets are positioned to slide in housing bores, each bore including an inwardly extending annular boss near one end. The seat portion of the valve engages the downstream side of this boss, while a seat-retaining guide, to which the seat portion is threadably connected, is positioned in the bore upstream of the annular boss. A compression spring is positioned between an upstream end portion of the seat-retaining guide and the upstream side of the boss, to urge the poppet toward the closed position. The seat-retaining guide slides within the bore and preferably includes longitudinal ridges which slide within corresponding grooves in the bore wall, for better guiding action and to prevent rotation of this portion of the poppet, particularly upon assembly when the seat member is screwed into the retaining guide. These components are thus assembled by inserting them into the housing from opposite ends, with the spring mounted on the retaining guide portion.

The valve assembly of the invention may optionally include a venting device, or "reduced pressure" feature, which comprises a venting valve connected to the space between the two check valves. The purpose of this venting valve is to vent any fluid which might leak back into the central space from the downstream line upon a failure or malfunction of the second check valve. The venting valve is connected by a conduit to the inlet line, and set so that the vent is open whenever inlet line pressure is below the threshold pressure of the first check valve. When inlet pressure is sufficient to open the first check valve, the vent closes and the valve assembly operates normally. However, when inlet pressure is below the first check valve's threshold pressure and back pressure from the outlet line leaks through the second check valve, the potentially contaminating leakage is passed out the venting valve. The valve assembly is used in a system where back pressure is never greater than the normal operating inlet line pressure, so that pressurized fluid which might leak through the second check valve never does so when the vent is closed.

The venting valve includes a sleeve coupler for connection between the two check valve units, so that it is interchangeable with a sleeve coupler used in the assembly when the venting valve is not included.

The venting valve utilizes a uniquely simple construction including a diaphragm-like resilient cylindrical valve closure member which is constantly subjected, at its outside surface, to the pressure existing in the inlet line. Just inside this cylindrical flexible member is a hollow dome-shaped seat member having a plurality of openings from its exterior into its interior and being open to the atmosphere at its lower end. When inlet line pressure is below the check valve threshold pressure, the flexible closure member is relaxed, and any back leakage from the second check valve flows down around the outside of the dome-shaped member, through the openings into its interior and is passed out to the atmosphere. When inlet line pressure is sufficient to open the first check valve, the diaphragm-like member is forced inwardly against the surfaces of the dome-shaped member to seal off the vent, preventing further venting of fluid from the space between the two check valves. The surface of the dome-shaped member is contoured to provide maximum contact with the flexible closure member when the valve is closed. The use of the diaphragm-like member simplifies the venting valve construction by combining the pressure sensing diaphgram-type function with the member which actually closes the valve. This feature keeps size and cost at a minimum, with maximum reliability.

It is therefore among the objects of the invention to provide an improved modular-type back flow preventer valve assembly which is economically manufactured, easily installed, repaired and replaced, and which includes triple safety features against back flow contamination without complex construction. These and other objects, advantages and features will be apparent from the following description of several preferred embodiments of the invention, taken in conjunction with the accompanying drawings.

DESCRIPTION OF THE DRAWINGS

FIG. 1 is a partially sectioned elevation view of a valve assembly according to the invention including a pair of series-connected check valves;

FIG. 2 is an exploded view showing the construction of a valve poppet of the check valves included in the valve assembly of FIG. 1;

FIG. 3 is an end view of the valve poppet;

FIG. 4 is a view of the same valve assembly as that of FIG. 1 but including a venting valve connected between the two check valves; and FIG. 5 is a partially sectioned view showing the venting valve of the FIG. 4 assembly in the closed position.

DESCRIPTION OF THE PREFERRED EMBODIMENTS

In the drawings, FIG. 1 shows a back flow preventer valve assembly 10 including a pair of preferably identical and interchangeable valve units 11 and 12 connected in tandem. Each of the units 11 and 12 is a check valve, including an internal bore 13 retaining a poppet assembly 14 in a housing 15. The poppet assembly 14 is shown in greater detail in the exploded view of FIG. 2. An annular inwardly-extending boss 16 in the bore 13 provides a seat for the check valve and a bearing surface against which a compression spring 17 acts.

The interchangeable valve units 11 and 12 are connected together and to inlet and outlet fittings 18 and 19 by sleeve-type couplings, forming an important feature of the invention. A connecting sleeve 21 between the two units slides over recesses 22 in the valve unit housings 15, each having an external cylindrical surface 23. Beveled corners 24 of the connecting sleeve 21 squeeze a resilient gasket 26 (preferably an O-ring) against each of the recesses 22 to seal the two housings 15 together.

At the inlet end of the valve assembly 10, a sleeve-type coupling 27 compresses another gasket ring 26 against an identical recess 22, and also seals against the inlet fitting 18 so that the fitting 18 is sealed in fluid engagement with the unit 11. This seal is formed by an internal cylindrical surface 28 which bears against a gasket ring 26 retained in an annular slot 29 of a cylindrical fitting surface 31 which is of the same diameter as that of the housing end surfaces 23. The coupling 27 has a shoulder 32 which, when assembled, is spaced from the housing 15 sufficiently to allow the fitting 18 a degree of longitudinal adjustment, with the coupling remaining sealed against the fitting by the O-ring. This provides a very desirable degree of flexibility in the assembly of the valve assembly 10 into a fluid line. The flexibility diminishes the need for precision in the length of piping, etc. Because of this sealing arrangement, the fitting 18 is also rotationally adjustable to any desired position with respect to the housings 15, so that in the case of a threaded fitting as shown, the final rotational position of the fitting, after tightening onto the inlet pipe, is not critical.

FIG. 1 also shows four pressure sensing ports 33 in each housing 15 for monitoring the pressure in the valve assembly 10 upstream of the first check valve 14 (not shown on the valve unit 11—see the valve unit 12), between the two check valves, and downstream of the second check valve 14. The ports are plugged unless pressure monitoring is desired. In that case test cocks may be installed.

At the downstream end of the back flow preventer valve assembly 10, the outlet fitting 19 may be similar to the inlet fitting 18 or may be of any other type, set up for threaded connection, soldered connection, plastic weld, etc. so long as it has an external cylindrical surface 31 similar to and of the same dimensions as that of the inlet fitting 18. In all other respects, the connection at this downstream end of the assembly 10 is identical to that of the Inlet end, including a sleeve-type coupling 27, O-ring connections, etc. The units 11 and 12 are thus completely interchangeable, as are the end couplings 27 and the fittings 18 and 19, and the central sleeve connector 21 is reversible in orientation.

The assembly 10 is held together by a plurality of longitudinally extending exterior tie bolts 34. The ends of the end couplings 27 thus bear against the housings 15, and the two housings bear against one another at the interface of the units, maintaining the integrity of all sealing areas, while allowing the fittings 18 and 19 longitudinal and rotational adjustment. As discussed above, this construction provides for a high degree of efficiency in installation, maintenance and replacement of components in the valve assembly 10.

FIGS. 2 and 3 show the construction of each of the poppet assemblies 14. A circular seat member 40 includes an annular recess 41 for receiving a resilient seat gasket ring 42 having a beveled bearing surface 43. FIG. 2 shows in dashed lines the annular boss 16 extending inward from the bore 13 within which the assembled poppet 14 is positioned. This boss 16 acts as a seat against which the longitudinally movable seat gasket 42 bears when the valve is closed, and also acts as a bearing surface for the compression spring 17. The spring 17 and a seat-retaining guide 44 around which it is positioned are assembled into the housing from the upstream end, while the seat member 40, with the seat gasket 42, enters the housing from the downstream side. A threaded stud 46 of the member 40 is then screwed into a threaded bore 47 of the guide 44 until the two are tightly engaged together. A tool slot 48 may be provided in the member 40 for this purpose, and the guide 44 preferably includes several longitudinal ridges 49 (see also FIG. 3) on an enlarged upstream end portion 51 for engagement in corresponding slots 52 (see FIG. 1) in the bore 13, so that the guide 44 is well supported in the bore 13 and is not permitted to rotate while the seat member 40 is being screwed into it.

FIG. 4 shows a back flow preventer valve assembly 54 which includes a venting or "reduced pressure" feature. This feature is embodied in a venting valve 55 connected between the two valve unit housings 15. The valve assembly 54 is identical in all respects to the above described assembly 10 except for the inclusion of the venting valve 55 and the use of a modified connection sleeve 56 between the two valve unit housings, in place of the sleeve connector 21 discussed above. Integral with the connector sleeve 56 is a vent fitting 57 having a central bore 58 leading into the space between the two check valves. The remainder of the venting valve 55 is comprised of a cylindrical housing 59, a bottom plate 61 from which a hollow generally dome-shaped seat member 62 extends into the housing, and a flexible diaphragm-like cylindrical valve closure member 63 which is retained in place around the member 62 by the housing, upper fitting 57 and bottom plate 61 as shown. Two or more tie bolts 60 extend between the fitting 57 and the bottom plate 61 to retain the unit together. A threaded opening 64 is connected by a line 65 to a pressure sensing port 33 upstream of the first check valve. Thus, pressure in the inlet line and upstream of the first check valve is communicated through the line 65 to the outside surface of the flexible cylindrical valve closure member 63. As discussed above, when such pressure exceeds the threshold pressure of the first check valve, the valve closure member 63 will be forced inwardly against the contoured surface of the hollow dome-shaped member 62 as shown in FIG. 5. This closes the vent valve 55 and prevents the venting of fluid from between the two check valves during normal operation. When inlet pressure is below the threshold pressure of the first valve, the venting valve closure member 63 relaxes to its position shown in FIG. 4, and any fluid escaping in a back flow motion through the second check valve will pass through the bore 58 and into the vent valve housing around the dome-shaped member 62. From here the fluid will pass through a plurality of openings 67 through the wall of the member 62 near its lower end and into the interior space of the member 62, from which it will pass outwardly to the atmosphere. The openings 67 are preferably elongated and oriented transversely to the general direction of flow of the vented fluid, as shown in FIG. 5. This provides support for the diaphragm-like closure member 63 in the closed position and provides for best sealing. FIG. 5 also illustrates the large surface area over which contact is made between the closure member 63 and the contoured surface of the hollow member 62. This also aids in providing a positive seal in the venting valve 55.

The above described preferred embodiments provide back flow preventer valve assemblies which are economically manufactured and easily installed, repaired and replaced, and which reliably prevent back flow contamination without complex and bulky structure. Various other embodiments and alterations to these preferred embodiments will be apparent to those skilled in the art and may be made without departing from the spirit and scope of the following claims.

I claim:

1. A back flow preventer valve assembly, comprising:
    a first valve unit including an inlet end, an outlet end and a check valve operable to open and admit flow toward the outlet end when a predetermined pressure differential exists between the outlet end and the inlet end, each end of the unit having an external cylindrical connecting surface;
    a second valve unit substantially identical and interchangeable in the assembly with the first valve unit;
    a sleeve connecting the outlet end of the first valve unit to the inlet end of the second valve unit, said sleeve having internal cylindrical surfaces at its ends circumjacent the external cylindrical connecting surfaces of the valve units, with resilient gaskets engaged between the sleeve and each valve unit and including means for seating the gaskets;
    an inlet fitting positioned adjacent to the inlet end of the first valve unit, said inlet fitting having a cylindrical downstream end portion shaped and sized similarly to said external cylindrical connecting surfaces, and including means for connection to a fluid supply line;
    an inlet end coupling connecting the inlet fitting to the inlet end of the first valve unit, said coupling having an internal cylindrical surface circumjacent the external surfaces of the inlet fitting and the inlet end of the first valve unit, with stop means at the upstream end of the coupling for limiting movement at the inlet fitting away from the valve unit, and means at the downstream end of the coupling abutting longitudinally against a surface of the first valve unit, with resilient gaskets engaged between the end coupling and each of the inlet fitting and the first valve and including means associated with the coupling, the fitting and the first valve unit for seating the gaskets,
    an outlet fitting positioned adjacent to the outlet end of the second valve unit having an external cylindrical surface similar to that of the inlet fitting, and including means for connection to a fluid delivery line;
    an outlet end coupling similar to and reversed in orientation from the inlet end coupling, and connected similarly with gaskets interposed between the outlet end coupling and each of the outlet fitting and the downstream end of the second valve unit;
    removable longitudinal fastening means extending between the inlet end coupling and the outlet end coupling and urging the couplings toward one another to tightly retain the valve assembly together;
    whereby the valve units may be removed without disconnection of the inlet and outlet fittings from the supply and delivery lines, by removing the fastening means and sliding the couplings longitudinally outwardly.

2. The back flow preventer valve assembly of claim 1 wherein said stop means on each end coupling is spaced from the valve unit sufficiently to afford longitudinal adjusting movement of the fitting, and wherein said means associated with the coupling, the fitting and the first valve unit includes an annular slot in the cylindrical downstream end portion of each fitting, seating the resilient gasket for outward engagement with the internal coupling surface, whereby the end fittings may be adjusted rotationally or longitudinally on the assembled valve.

3. The back flow preventer valve assembly of claim 1 wherein said external cylindrical connecting surfaces of each end of each valve unit are of the same diameter and longitudinal depth, so that the inlet and outlet fittings are interchangeable, the inlet and outlet end couplings are interchangeable, and the connecting sleeve is reversible.

4. The back flow preventer valve assembly of claim 1 wherein each valve unit includes a housing having a generally cylindrical bore with an annular internally extending boss near one end of the bore, and a valve poppet within the bore, said poppet being assembled of plural components including a compression spring bearing against the upstream side of the annular boss, a slidable seat retaining guide having an upstream end positioned to slide along the bore and against which the upstream end of the spring bears, a seat member on the downstream side of the annular boss, retaining an annular resilient closure member which bears against the downstream side of the annular boss when the valve is closed, and fastening means connecting the seat member to the seat retaining guide.

5. A back flow preventer valve assembly, comprising a pair of check valves arranged in series for connection into a pressurized fluid line, the two valves being in respective housings removably retained together, each check valve comprising:

a generally cylindrical bore in the housing with an annular internally extending boss and including longitudinal slots in the upstream end of the bore;

a valve poppet within the bore, said poppet being assembled of plural components including a compression spring bearing against the upstream side of the annular boss, a slidable seat retaining guide having an upstream end positioned to slide along the bore, with longitudinal bosses on the outer surface of the guide positioned to slide in the longitudinal slots of the bore, said upstream end of the spring bearing against said upstream end of the guide, a seat member on the downstream side of the annular boss, retaining an annular resilient closure member which bears against the downstream side of the annular boss when the valve is closed, and fastening means connecting the seat member to the seat retaining guide and comprising a screw threaded connection between the seat member and the seat retaining guide, whereby upon assembly of the valve poppet, the seat member may be screwed into the seat retaining guide with the seat retaining guide held against rotation by the longitudinal bosses and slots.

* * * * *